(12) United States Patent
Nautiyal et al.

(10) Patent No.: US 10,261,924 B2
(45) Date of Patent: Apr. 16, 2019

(54) COMMUNICATION SYSTEM FOR TRANSMITTING AND RECEIVING CONTROL FRAMES

(71) Applicant: FREESCALE SEMICONDUCTOR, INC., Austin, TX (US)

(72) Inventors: Hemant Nautiyal, Noida (IN); Rajan Kapoor, Faridabad (IN); Arvind Kaushik, Ghaziabad (IN); Puneet Khandelwal, Noida (IN)

(73) Assignee: NXP USA, INC., Austin, TX (US)

( * ) Notice: Subject to any disclaimer, the term of this patent is extended or adjusted under 35 U.S.C. 154(b) by 183 days.

(21) Appl. No.: 15/227,834

(22) Filed: Aug. 3, 2016

(65) Prior Publication Data

US 2018/0039589 A1    Feb. 8, 2018

(51) Int. Cl.
    *G06F 13/24* (2006.01)
    *G06F 13/42* (2006.01)
(52) U.S. Cl.
    CPC .......... *G06F 13/24* (2013.01); *G06F 13/4286* (2013.01); *Y02D 10/14* (2018.01); *Y02D 10/151* (2018.01)
(58) Field of Classification Search
    None
    See application file for complete search history.

(56) References Cited

U.S. PATENT DOCUMENTS

| | | | |
|---|---|---|---|
| 7,100,020 B1 | 8/2006 | Brightman et al. | |
| 7,403,542 B1* | 7/2008 | Thompson | H04L 69/16 370/389 |
| 7,493,416 B2* | 2/2009 | Pettey | G06F 13/12 709/249 |
| 7,567,620 B2* | 7/2009 | Rozental | H04L 12/2801 375/260 |
| 7,742,484 B2* | 6/2010 | Makishima | H04Q 11/0005 370/229 |
| 8,964,791 B2* | 2/2015 | Vu | H04L 1/0008 370/504 |
| 9,203,645 B2 | 12/2015 | Haviv et al. | |
| 2008/0275989 A1* | 11/2008 | Ebersole | H04L 12/4625 709/225 |

(Continued)

*Primary Examiner* — Henry Tsai
*Assistant Examiner* — Christopher A Bartels
(74) *Attorney, Agent, or Firm* — Charles E. Bergere (57) ABSTRACT

A communication system for communicating control data between a processor and an interface includes configuration registers, a packet processor, an interrupt processor, a timing monitor, a configuration sampler, a control-frame processor, a mode selector, and a transceiver. The processor, timing monitor, and configuration sampler generate control data, a timing signal and frame structure data, respectively. The packet processor generates a transmit control configuration packet, which includes the control data. The control-frame processor inserts the transmit control configuration packet into a first control frame, outputs the control frame to the interface and extracts a receive-configuration packet from a second control frame for generating one or more interrupts. The mode selector generates mode and idle signals for determining the mode of the interface, based on the idle signal. In one implementation, the system uses JESD control frames to reduce GPIO pin usage.

14 Claims, 1 Drawing Sheet

(56) References Cited

U.S. PATENT DOCUMENTS

| | | | |
|---|---|---|---|
| 2010/0125661 A1* | 5/2010 | Perala | G06F 15/173 709/224 |
| 2011/0131346 A1* | 6/2011 | Noeldner | G06F 12/00 710/22 |
| 2012/0230455 A1* | 9/2012 | Hennedy | H04L 25/14 375/354 |
| 2013/0117621 A1* | 5/2013 | Saraiya | H04L 49/356 714/748 |
| 2013/0138836 A1* | 5/2013 | Cohen | H04L 49/351 709/250 |
| 2014/0094157 A1* | 4/2014 | Nguyen | H04W 88/085 455/418 |
| 2014/0105101 A1* | 4/2014 | Vu | H04L 1/0008 370/328 |
| 2014/0289434 A1* | 9/2014 | Ranganathan | G06F 13/42 710/105 |
| 2015/0016471 A1* | 1/2015 | Keyes, Jr. | H04L 43/18 370/466 |
| 2015/0195765 A1* | 7/2015 | Bhardwaj | H04W 40/02 370/338 |
| 2016/0143041 A1* | 5/2016 | Zhao | H04B 1/406 370/330 |

\* cited by examiner

COMMUNICATION SYSTEM FOR TRANSMITTING AND RECEIVING CONTROL FRAMES

BACKGROUND

The present invention relates generally to a communication network, and, more particularly, to a communication system in a communication network for transmitting and receiving control frames in a manner that makes efficient usage of device pins.

A communication network includes multiple communication terminals such as user equipment (UEs), base stations, modems, and routers that communicate with each other over an air interface. Examples of UEs include handheld devices such as cell phones, tablets, personal digital assistants (PDAs), and laptops with mobile broadband adapters. Each communication terminal includes a radio frequency integrated circuit (RFIC) connected to an antenna for transmitting and receiving communication data to and from another communication terminal/node. The RFIC includes a processor, peripheral circuits, and an interface. Examples of the interface include common public radio interface (CPRI) and a Joint Electron Devices Engineering Council (JEDEC) Standards Document (JESD) 204B-compliant serial interface. Examples of the peripheral circuits include a digital-to-analog converter (DAC), an analog-to-digital converter (ADC), a power amplifier, a low-noise amplifier (LNA) and the like.

The processor is connected to the peripheral circuits via the interface using general purpose input/output (GPIO) pins. The processor generates control data for the operation of the peripheral circuits. The control data includes an interrupt, a communication data status bit, clock data corresponding to a clock signal, voltage-mode select data corresponding to a voltage-mode select signal, an enable bit corresponding to an enable signal, and the like. For example, an ADC connected to at least one of the GPIO pins receives first control data via the GPIO pin. Similarly, a DAC connected to one of the GPIO pins receives second control data via the GPIO pin. However, the processor uses a significant number of GPIO pins to transmit the control data to the peripheral circuits, which limits the number of GPIO pins available to connect additional peripheral circuits to the processor. Thus, it is important to minimize the number of GPIO pins required to connect the processor to the RFIC.

Further, the RFIC consumes a lot of power in transmitting and receiving the communication data. Various communication standards such as wireless fidelity (Wi-Fi), wireless local area network (WLAN), Bluetooth, and Ethernet are associated with the air interface used for the transmission and reception of the communication data between communication terminals. The processor generates the communication data as a set of packets conforming to the various communication standards. To transmit the communication data from the communication terminal, the processor transmits the set of packets to the DAC using the interface. The DAC then transmits the set of packets to the air interface using the antenna. On the other hand, during reception of the communication data, the antenna receives the set of packets. The ADC connected to the antenna receives and forwards the set of packets to the processor. However, the processor, the interface, the ADC, the DAC, and the antenna are active not only during the transmission and reception of the communication data but also when no communication data is being transmitted and received, which results in excessive power consumption by the RFIC.

One way to overcome the excessive power usage issue is to use start of frame (SOF) and end of frame (EOF) data to indicate the start and end of transmission of the communication data. Typically, the processor includes software-implemented logic to detect the SOF and EOF data. When the software-implemented logic detects the EOF data, then the processor switches off the power supply to the interface. Thus, the interface is inactivated or idle and is said to be in an idle mode.

When the software-implemented logic detects a SOF data, then the processor switches on the power supply to the interface, activating the interface such that the interface is in an active mode. The transition of the interface between the idle and active modes reduces the power consumption of the RFIC. However, the software-implemented logic is not very fast in detecting and switching the interface mode. Hence, any communication data transmitted or received during this transition period may be lost.

One way to avoid such a delay is to include a detection system between the processor and the interface to detect the EOF and SOF data. The detection system polls the interface at regular intervals to detect the EOF and SOF data, and generates a mode select signal, based on the detection of the EOF and SOF data, and transmits the mode select signal to the processor. Consequently, the processor turns the power supply on or off based on the mode select signal. The detection system overcomes the delay introduced by the software-implemented logic and thus, avoids the loss of communication data. However, the detection system has to be constantly powered to continuously poll the interface, regardless of the mode of the interface. This again results in excessive power consumption by the RFIC.

It would be advantageous to have an RFIC that uses fewer GPIO pins and has reduced power consumption.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a communication system connected between a processor and an interface for transmitting and receiving first and second control frames, respectively. The first and second control frames correspond to first and second data. The communication system includes a set of configuration registers, a packet processor, an interrupt processor, a timing monitor circuit, a configuration sampler, a control frame processor, and a transceiver. The set of configuration registers receives at least one of first and second control data from the processor and stores the at least one of the first and second control data. The set of configuration registers outputs at least one of first and second control-configuration data based on the first and second control data. The packet processor receives at least one receive-configuration packet and is connected to the set of configuration registers for receiving the first control-configuration data. The packet processor generates at least one transmit-configuration packet and receive-configuration data based on the first control-configuration data and the at least one receive-configuration packet, respectively. The interrupt processor is connected to the packet processor and the set of configuration registers to receive the receive-configuration data and the second control-configuration data, respectively. The interrupt processor generates at least one interrupt. The configuration sampler receives at least one of first and second frame-configuration data and identifies first and second frame-structure data based on the first and second frame-configuration data, respectively. The configuration sampler outputs at least one of the first and second frame-structure data. The timing monitor circuit receives at least one of first and second frame-timing data and outputs at least one of first and second timing signals, respectively. The control-frame processor is connected to the packet processor, the configuration sampler, and the timing monitor circuit for receiving the at least one transmit-configuration packet, the at least one of the first and second frame-structure data, and the at least one of the first and second timing signals, respectively. The control-frame processor generates the first control frame based on the at least one transmit-configuration packet, the first timing signal, and the first frame-structure data. The control-frame processor also receives the second control frame and generates the at least one receive-configuration packet based on the second control frame, the second timing signal, and the second frame-structure data. The transceiver is connected to the interface, the processor, and the control-frame processor for receiving the second data and the second control frame including second configuration data, the first data and first configuration data, and the first control frame, respectively. The transceiver identifies the first and second frame-configuration data based on the first and second configuration data, respectively, and the first and second frame-timing data based on the first and second configuration data, respectively. The transceiver outputs the at least one of the first and second frame-configuration data, the at least one of the first and second frame-timing data, the first control frame, and the first data. The interface receives the first control frame and the first data. Thus, the communication system transmits and receives the first and second control frames corresponding to the first and second data, respectively.

In another embodiment, the present invention is a radio frequency integrated circuit (RFIC) that includes a processor, a communication system, and an interface. The processor generates first and second control data, and first configuration data. The communication system is connected to the processor for receiving the first configuration data and the first and second control data. The communication system transmits and receives first and second control frames corresponding to first and second data, respectively. The communication system includes a set of configuration registers, a packet processor, an interrupt processor, a timing monitor circuit, a configuration sampler, a control-frame processor, and a transceiver. The set of configuration registers receives at least one of the first and second control data from the processor and stores the at least one of the first and second control data. The set of configuration registers outputs at least one of first and second control-configuration data based on the first and second control data. The packet processor receives at least one receive-configuration packet and is connected to the set of configuration registers for receiving the first control-configuration data. The packet processor generates at least one transmit-configuration packet and receive-configuration data based on the first control-configuration data and the at least one receive-configuration packet, respectively. The interrupt processor is connected to the packet processor and the set of configuration registers to receive the receive-configuration data and the second control-configuration data, respectively. The interrupt processor generates at least one interrupt. The configuration sampler receives at least one of first and second frame-configuration data and identifies first and second frame-structure data based on the first and second frame-configuration data, respectively. The configuration sampler outputs at least one of the first and second frame-structure data. The timing monitor circuit receives at least one of first and second frame-timing data and outputs at least one of first and second timing signals, respectively. The control-frame processor is connected to the packet processor, the configuration sampler, and the timing monitor circuit for receiving the at least one transmit-configuration packet, the at least one of the first and second frame-structure data, and the at least one of the first and second timing signals, respectively. The control-frame processor generates the first control frame based on the at least one transmit-configuration packet, the first timing signal, and the first frame-structure data. The control-frame processor also receives the second control frame and generates the at least one receive-configuration packet based on the second control frame, the second timing signal, and the second frame-structure data. The transceiver is connected to the interface, the processor, and the control-frame processor for receiving the second data and the second control frame including second configuration data, the first data and the first configuration data, and the first control frame, respectively. The transceiver identifies the first and second frame-configuration data based on the first and second configuration data, respectively, and the first and second frame-timing data based on the first and second configuration data, respectively. The transceiver outputs the at least one of the first and second frame-configuration data, the at least one of the first and second frame-timing data, the first control frame, and the first data. The interface outputs the second control frame and the second data. Further, the interface is connected to the communication system for receiving the first control frame and the first data. Thus, the communication system transmits and receives the first and second control frames corresponding to the first and second data, respectively.

Various embodiments of the present invention provide an RFIC that includes a processor, a communication system, and an interface. The communication system includes a set of configuration registers, a packet processor, an interrupt processor, a timing monitor circuit, a configuration sampler, a control-frame processor, a mode selector, and a transceiver. During transmission of a first control frame and first data, the processor generates first control data and first configuration data. During reception of a second control frame and second data, the processor generates second control data and receives second configuration data. The set of configuration registers stores and outputs the first configuration data and the first control data as first control-configuration data, and the second configuration data and the second control data as second control-configuration data.

The packet processor receives the first control-configuration data and a receive-configuration packet, and generates a transmit-configuration packet and receive-configuration data based on the first control-configuration data and the receive-configuration packet, respectively. The timing monitor circuit receives frame-timing data from the transceiver and generates a timing signal. The configuration sampler receives frame-configuration data from the transceiver and generates the frame-structure data. The control-frame processor receives the transmit-configuration packet, the timing signal and the frame-structure data, and generates the first control frame. The control-frame processor outputs the receive-configuration packet based on the timing signal, the frame-structure data, and the second control frame. The interrupt processor generates a set of interrupts based on the receive-configuration data and the second control-configuration data. The mode selector is connected to the control-frame processor and generates a mode signal and an idle signal. The configuration sampler updates the frame-structure data based on the mode signal. The transceiver receives the idle signal and determines the mode of the interface based on the idle signal. The transceiver receives the first control frame and outputs it to the interface along with the first data. The transceiver outputs the second data and the second control frame to the processor.

Thus, the processor generates the first control data and the transceiver transmits it along with the first control frame to the interface. The interrupt processor generates a set of interrupts based on the second control frame received from the interface and the second control data. The interface is further connected to a set of peripheral circuits that use the first and second control data for their operation. Thus, the processor does not use a large number of GPIO pins to transmit and receive the first and second control data. This increases the number of GPIO pins available for connecting additional peripheral circuits. Further, when the mode selector detects the mode of the transmission of the second control frame and the second data as the burst mode, the mode selector generates the mode signal and the idle signal. The transceiver updates the mode of the interface to an idle mode and an active mode based on the idle signal. Thus, the communication system changes the mode of the interface without a delay. This ensures accurate transmission and reception of the first and second data, respectively. Moreover, the communication system changes the mode of the interface without continuously polling the interface and thus reduces the power consumption of the RFIC.

A communication network includes a set of communication terminals including first and second communication terminals that communicate with each other. Examples of the communication terminals include a base station, a modem, a router, and user equipment (UEs). Examples of the UEs include hand-held devices such as cell phones, PDAs, tablets, and laptops with mobile broadband adapters. Each of the first and second communication terminals includes a RFIC and an antenna.

Figure 1:
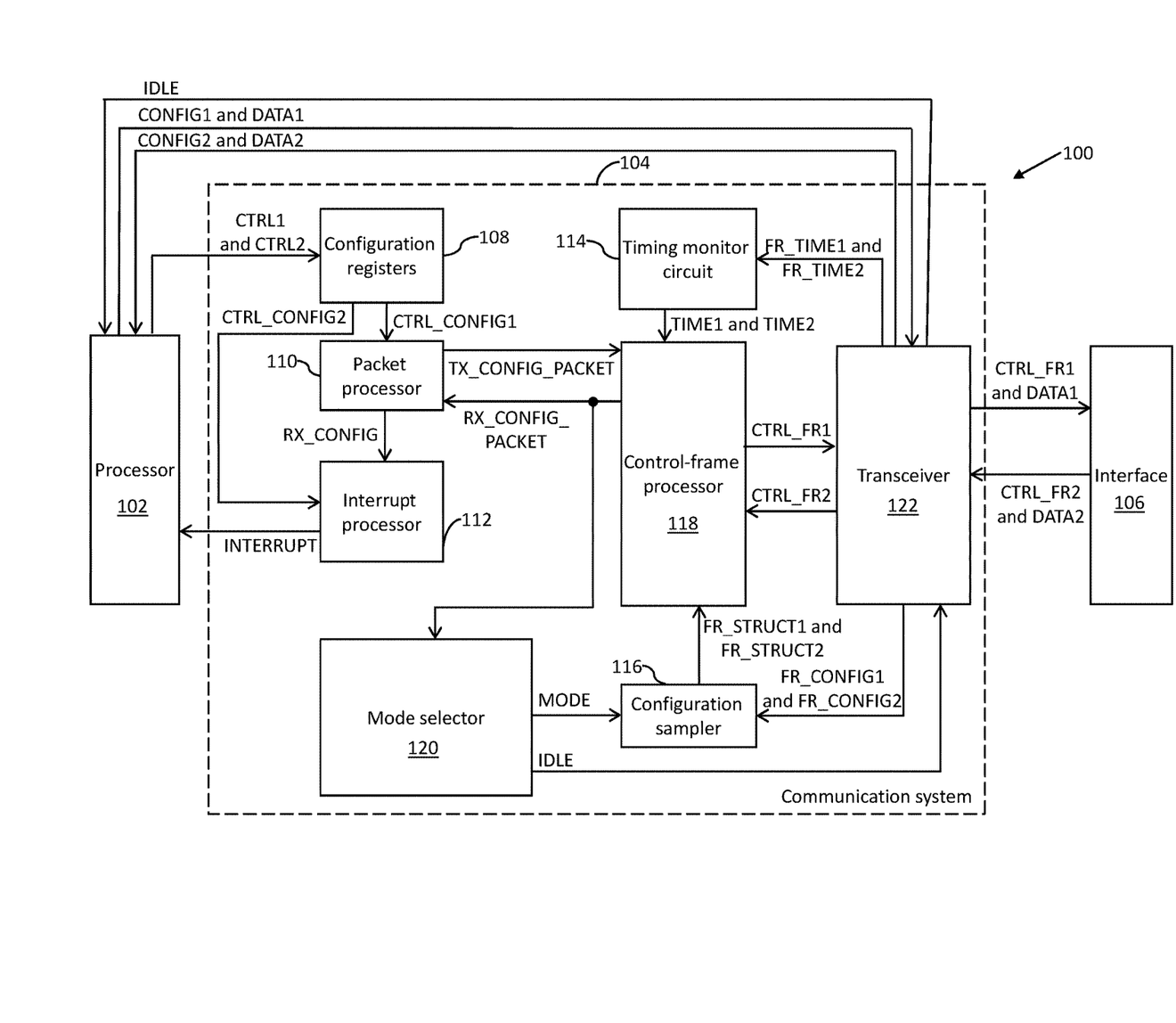
FIG. 1 is a schematic block diagram of a radio frequency integrated circuit (RFIC) that includes a communication system in accordance with an embodiment of the present invention.

Referring now to FIG. 1, a schematic block diagram of an RFIC 100 in accordance with an embodiment of the present invention is shown. The RFIC 100 includes a first processor 102, a first communication system 104, an interface 106, a second communication system (not shown), a second processor (not shown), and a set of peripheral circuits (not shown). Examples of the first processor 102 and the second processor include a baseband processor and a digital signal processor. Examples of the set of peripheral circuits include a digital-to-analog converter (DAC), an analog-to-digital converter (ADC), a power amplifier, a low-noise amplifier (LNA) and the like.

In the presently preferred embodiment, the interface 106 is a Joint Electron Devices Engineering Council (JEDEC) Standards Document (JESD) 204B-compliant serial interface. Further, the first communication terminal includes the RFIC 100. The first communication terminal transmits first communication data to the second communication terminal, and receives second communication data from the second communication terminal. The first communication data includes a first control frame CTRL_FR1 and first data DATA1. The second communication data includes a second control frame CTRL_FR2 and second data DATA2. The first and second control frames CTRL_FR1 and CTRL_FR2 include first and second configuration data CONFIG1 and CONFIG2, respectively.

The first processor 102 is connected to the first communication system 104 which is further connected to the interface 106. The interface 106 is connected to the second communication system which in turn is connected to the second processor and the set of peripheral circuits. In one embodiment, the set of peripheral circuits includes an ADC and a DAC. The ADC and the DAC are connected to the antenna. It will be understood to a person skilled in the art that the RFIC 100 may include more than one ADC and one DAC.

The first processor 102 generates first and second control data CTRL1 and CTRL2 for the operation of the ADC and DAC. Each of the first and second control data CTRL1 and CTRL2 includes at least one interrupt, at least one communication data status bit, clock data corresponding to a clock signal, voltage-mode select data corresponding to a voltage-mode select signal, an enable bit corresponding to an enable signal, and the like. For example, the ADC and DAC operate based on the clock data, the enable bit, and the voltage-mode select data.

The first processor 102 further generates the first configuration data CONFIG1 and the first data DATA1, and the first and second control data CTRL1 and CTRL2. Further, the second processor generates third and fourth control data corresponding to the first and second control data CTRL1 and CTRL2. The first communication system 104 is connected to the first processor 102 and receives the first configuration data CONFIG1, the first data DATA1, and the first and second control data CTRL1 and CTRL2. The first communication system 104 transmits the first communication data and the first control data CTRL1 by way of the interface 106 to the second communication system. The second communication system is connected to the second processor and receives the third and fourth control data. The second communication system generates a first set of interrupts based on the comparison between the first control data CTRL1 and the corresponding third control data. The second processor receives the first set of interrupts corresponding to the first control data CTRL1. The DAC also receives the first communication data and transmits it to the second communication terminal by way of the antenna.

The ADC receives the second communication data from the second communication terminal by way of the antenna. The second communication system is connected to the ADC to receive the second communication data. The second communication system transmits the second communication data and the fourth control data to the first communication system 104 by way of the interface 106. The first communication system 104 generates a second set of interrupts based on the comparison between the second control data CTRL2 and the corresponding fourth control data. The first processor 102 receives the second set of interrupts corresponding to the second control data CTRL2. The first processor 102 is connected to the first communication system 104 to receive the second communication data.

The first communication system 104 includes a set of configuration registers 108, a packet processor 110, an interrupt processor 112, a timing monitor circuit 114, a configuration sampler 116, a control-frame processor 118, a mode selector 120, and a transceiver 122. The second communication system is structurally and functionally similar to the first communication system 104. The first and second control frames CTRL_FR1 and CTRL_FR2 include the first and second configuration data CONFIG1 and CONFIG2 as defined by a protocol for the JESD 204B-compliant serial interface.

The first configuration data CONFIG1 includes first frame-configuration data FR_CONFIG1 and first frame-timing data FR_TIME1. In one embodiment, the first frame-configuration data FR_CONFIG1 includes first frame-structure data FR_STRUCT1, which includes fields such as a JESD 204B interface lane number, a converter number, a converter bit number, a control-frame format bit, length and size of the first control frame CTRL_FR1, and mode data of the transmission of the first communication data. The converter number indicates the number of ADCs or DACs of the RFIC 100. The converter bit number indicates the number of bits of the ADC or the DAC. For example, when the RFIC 100 includes a 12-bit ADC or a 12-bit DAC the converter bit number is 12. The control-frame format bit indicates a set of positions of a corresponding set of empty fields within the first control frame CTRL_FR1. When the control-frame format bit is at a first logic state, the first control frame CTRL_FR1 includes at least one empty field after a number of bits that is equal to the converter bit number. When the control-frame format bit is at a second logic state, the first control frame CTRL_FR1 includes the set of empty fields at the end of the first control frame CTRL_FR1. The mode data indicates a burst or a continuous mode of the transmission of the first communication data.

The first frame-timing data FR_TIME1 includes a set of bits that indicate whether the corresponding set of fields of the first control frame CTRL_FR1 is empty. In one embodiment, when a bit of the set of bits of the first frame-timing data FR_TIME1 is equal to binary one, the corresponding field of the first control frame CTRL_FR1 is an empty field. When a bit of the set of bits of the first frame-timing data FR_TIME1 is equal to binary zero, the corresponding field of the first control frame CTRL_FR1 is not an empty field.

The second control frame CTRL_FR2 is structurally and functionally similar to the first control frame CTRL_FR1 and includes second configuration data CONFIG2. The second configuration data CONFIG2 includes second frame-configuration data FR_CONFIG2 and second frame-timing data FR_TIME2. Further, the second frame-configuration data FR_CONFIG2 includes second frame-structure data FR_STRUCT2. The first and second frame-configuration data FR_CONFIG1 and FR_CONFIG2 are collectively referred to as 'frame-configuration data FR_CONFIG'. The first and second frame-timing data FR_TIME1 and FR_TIME2 are collectively referred to as 'frame-timing data FR_TIME'. The first and second frame-structure data FR_STRUCT1 and FR_STRUCT2 are collectively referred to as 'frame-structure data FR_STRUCT'.

The transceiver 122 is connected to the first processor 102 and receives the first configuration data CONFIG1 and the first data DATA1 based on a clock signal. In one embodiment, the first processor 102 provides the clock signal to the transceiver. Further, the transceiver 122 is connected to the interface 106 and receives the second control frame CTRL_FR2 and the second data DATA2 based on the clock signal. The transceiver 122 receives the set of bits of the frame-timing data FR_TIME in a corresponding set of clock cycles of the clock signal. The transceiver 122 outputs the first control frame CTRL_FR1 and the first data DATA1 to the interface 106. The transceiver 122 also outputs the second configuration data CONFIG2 and the second data DATA2 to the first processor 102. The transceiver 122 receives an idle signal IDLE and updates a mode of the interface 106 based on the logic state of the idle signal IDLE. The mode of the interface 106 is either an idle or an active mode. In one embodiment, the mode of the interface 106 is stored in an interface configuration register (not shown). The first processor 102 controls a power supply (not shown) to the interface 106 based on the mode thereof.

The configuration sampler 116 is connected to the transceiver 122 to receive the frame-configuration data FR_CONFIG. The configuration sampler 116 identifies and outputs the frame-structure data FR_STRUCT from the frame-configuration data FR_CONFIG. In one embodiment, the configuration sampler 116 receives the clock signal from the processor 102. The configuration sampler 116 also receives a mode signal MODE, and updates the frame-structure data FR_STRUCT with start of frame (SOF) data in a first clock cycle of the clock signal and end of frame (EOF) data in a second clock cycle of the clock signal of each of the first and second control frames CTRL_FR1 and CTRL_FR2 based on the mode signal MODE. It will be understood by a person skilled in the art that the first and second clock cycles are not consecutive.

The timing monitor circuit 114 is connected to the transceiver 122 and receives the first and second frame-timing data FR_TIME1 and FR_TIME2, and generates first and second timing signals TIME1 and TIME2, respectively. The first and second timing signals TIME1 and TIME2 are collectively referred to as timing signal TIME. The timing monitor circuit 114 generates the timing signal TIME for the set of clock cycles of the clock signal corresponding to the set of bits of the frame-timing data FR_TIME. The timing signal TIME is at the first logic state during a clock cycle of the set of clock cycles when a corresponding bit of the set of bits of the frame-timing data FR_TIME is equal to binary one. Similarly, the timing signal TIME is at the second logic state during a clock cycle of the set of clock cycles when a corresponding bit of the set of bits of the frame-timing data FR_TIME is equal to binary zero.

The set of configuration registers 108 are connected to the first processor 102 for receiving and storing the first and second configuration data CONFIG1 and CONFIG2 and the first and second control data CTRL1 and CTRL2. The set of configuration registers 108 includes a control bit valid register, a mode select register, a configuration mode register and an interrupt enable register. The control bit valid register stores the set of communication data status bits. The mode select register stores the mode data that indicates the burst or the continuous mode of transmission and reception of the first and second communication data, respectively. The configuration mode register stores the SOF and EOF data of each of the first and second control frames CTRL_FR1 and CTRL_FR2 when the mode data indicates the burst mode of transmission.

The interrupt enable register includes a set of interrupt enable bits for enabling a corresponding set of interrupts INTERRUPT. When an interrupt enable bit of the set of interrupt enable bits is at the first logic state, the corresponding interrupt is enabled and when the interrupt enable bit is at the second logic state, the corresponding interrupt is disabled. The interrupt enable register also includes a set of interrupt type bits. Each interrupt type bit indicates whether the corresponding interrupt is a pulse interrupt or a level interrupt. The pulse interrupt is a pulse signal and is active for a finite period of time. The value of the level interrupt depends on the logic state of the corresponding interrupt and is active till the first processor 102 services the corresponding interrupt. When an interrupt type bit of the set of interrupt type bits is at the first logic state, the corresponding interrupt is the pulse interrupt. When the interrupt type bit is at the second logic state, the corresponding interrupt is the level interrupt.

The first configuration data CONFIG1 and the first control data CTRL1 are together referred to as first control-configuration data CTRL_CONFIG1. The second configuration data CONFIG2 and the second control data CTRL2 are together referred to as second control-configuration data CTRL_CONFIG2. The set of configuration registers 108 outputs the first and second control-configuration data CTRL_CONFIG1 and CTRL_CONFIG2.

The packet processor 110 is connected to the set of configuration registers 108 for receiving the first control-configuration data CTRL_CONFIG1 and formats the first control-configuration data CTRL_CONFIG1 in a packet format. A packet format of data is a unit of data that includes source and destination data corresponding to the data. The packet processor 110 generates a transmit-configuration packet TX_CONFIG_PACKET based on the first control-configuration data CTRL_CONFIG1. Further, the packet processor 110 is connected to the control-frame processor 118 and receives a receive-configuration packet RX_CONFIG_PACKET. The receive-configuration packet RX_CONFIG_PACKET is structurally and functionally similar to the transmit-configuration packet TX_CONFIG_PACKET. The packet processor 110 generates and outputs receive-configuration data RX_CONFIG based on the receive-configuration packet RX_CONFIG_PACKET.

The interrupt processor 112 is connected to the packet processor 110 and the set of configuration registers 108 to receive the receive-configuration data RX_CONFIG and the second control-configuration data CTRL_CONFIG2, respectively. The interrupt processor 112 compares the receive-configuration data RX_CONFIG with the second control-configuration data CTRL_CONFIG2. When the receive-configuration data RX_CONFIG is not equal to the second control-configuration data CTRL_CONFIG2, the interrupt processor 112 generates a set of interrupts INTERRUPT. For example, when a field of the receive-configuration data RX_CONFIG that includes the voltage-mode select data is not equal to the corresponding field of the second control-configuration data CTRL_CONFIG2, the interrupt processor 112 generates a voltage-mode select interrupt, based on the logic state of the corresponding interrupt enable bit and the corresponding interrupt type bit.

The control-frame processor 118 is connected to the timing monitor circuit 114 and the configuration sampler 116 to receive the timing signal TIME and the frame-structure FR_STRUCT, respectively. The control-frame processor 118 is also connected to the packet processor 110 and the transceiver 122. The control-frame processor 118 receives the transmit-configuration packet TX_CONFIG_PACKET and the second control frame CTRL_FR2 during the transmission of the first communication data and the reception of the second communication data, respectively. The control-frame processor 118 inserts the transmit-configuration packet TX_CONFIG_PACKET in the frame-structure data FR_STRUCT when the first timing signal TIME1 is at the first logic state. Thus, the control-frame processor 118 generates the first control frame CTRL_FR1, which includes the transmit-configuration packet TX_CONFIG_PACKET. The control-frame processor 118 identifies the receive-configuration packet RX_CONFIG_PACKET in the second control frame CTRL_FR2 when the second timing signal TIME2 is at the first logic state based on the frame-structure data FR_STRUCT.

The mode selector 120 is connected to the control-frame processor 118 to receive the receive-configuration packet RX_CONFIG_PACKET and generate the mode signal MODE. The mode selector 120 also generates the idle signal IDLE based on the mode signal MODE. The mode signal MODE indicates whether the second communication data is received in the burst or the continuous mode. The mode signal MODE also indicates whether the first communication data is to be transmitted in the burst or the continuous mode. In the continuous mode of communication, the first communication system 104 continuously receives the second communication data. In the burst mode of communication, the first communication system 104 receives the second communication data at irregular time intervals. When the mode signal MODE indicates the burst mode, the mode signal MODE includes the SOF data in the first clock cycle and the EOF data in the second clock cycle. The mode selector 120 generates the idle signal IDLE at the first and second logic states when the mode signal MODE includes the SOF and the EOF data, respectively.

In operation, the first processor 102 generates the first configuration data CONFIG1, the first control data CTRL1, and the first data DATA1. The transceiver 122 receives the first configuration data CONFIG1, which includes a first bit of the set of bits of the first frame timing data FR_TIME1 in a first clock cycle of the clock signal. In one embodiment, the first bit is equal to binary 1. The set of configuration registers 108 stores the first configuration data CONFIG1 and the first control data CTRL1 as the first control-configuration data CTRL_CONFIG1. The packet processor 110 receives the first control-configuration data CTRL_CONFIG1 and generates the transmit-configuration packet TX_CONFIG_PACKET. The timing monitor circuit 114 receives the first bit of the first frame-timing data FR_TIME1 and generates the first timing signal TIME1 at the first logic state in the first clock cycle. The configuration sampler 116 receives the first frame-configuration data FR_CONFIG1 and generates the first frame-structure data FR_STRUCT1. The control-frame processor 118 inserts the transmit-configuration packet TX_CONFIG_PACKET in the first frame structure FR_STRUCT1 in the first clock cycle. Thus, the control-frame processor 118 generates the first control frame CTRL_FR1, which includes the transmit-configuration packet TX CONFIG PACKET. The transceiver 122 receives the first control frame CTRL_FR1 and the first data DATA1, and outputs the first control frame CTRL FR1 and the first data DATA1 to the interface 106. The second communication system receives the first control frame CTRL_FR1 and the first data DATA1 and generates at least one interrupt INTERRUPT based on the transmit-configuration packet TX_CONFIG_PACKET. The DAC and the ADC operate based on the at least one interrupt INTERRUPT. The DAC also receives the first control frame CTRL_FR1 and the first data DATA1 and transmits the first control frame CTRL_FR1 and the first data DATA1 to the second communication terminal by way of the antenna.

The ADC receives the second configuration data CONFIG2 and the second data DATA2 from the second communication terminal by way of the antenna. The second communication system receives the second control data CTRL2 from the second processor and generates the receive-configuration packet RX_CONFIG_PACKET. The second communication system further receives the second configuration data CONFIG2 and the second data DATA2 and inserts the receive-configuration packet in the second configuration data CONFIG2. The second communication system transmits the second data DATA2 and the second control frame CTRL_FR2, which includes the receive-configuration packet RX_CONFIG_PACKET.

The interface 106 receives and outputs the second control frame CTRL_FR2 and the second data DATA2. The first processor 102 also generates the second control data CTRL2. The transceiver 122 receives the second control frame CTRL_FR2, which includes a second bit of the set of bits of the second frame-timing data FR_TIME2 in a second clock cycle of the clock signal. In one embodiment, the second bit is equal to binary 1. The transceiver 122 further receives the second data DATA2, and transmits the second configuration data CONFIG2 and the second data DATA2 to the first processor 102.

The set of configuration registers 108 stores the second configuration data CONFIG2 and the second control data CTRL2 as the second control-configuration data CTRL_CONFIG2. The timing monitor circuit 114 receives the second frame-timing data FR_TIME2 and generates the second timing signal TIME2 at the first logic state in the second clock cycle. The configuration sampler 116 receives the second frame-configuration data FR_CONFIG2 and generates the second frame-structure data FR_STRUCT2. In the second clock cycle, the control-frame processor 118 identifies the receive-configuration packet RX_CONFIG_PACKET from the second control frame CTRL_FR2, based on the second frame-structure data FR_STRUCT2. The packet processor 110 receives the receive-configuration packet RX_CONFIG_PACKET and generates the receive-configuration data RX_CONFIG.

The interrupt processor 112 compares the second control-configuration data CTRL_CONFIG2 with the receive-configuration data RX_CONFIG. In one embodiment, the second control-configuration data CTRL_CONFIG2 includes a field that stores the voltage-mode select data which is not equal to the corresponding field of the receive-configuration data RX_CONFIG. Since the second control-configuration data CTRL_CONFIG2 and the receive-configuration data RX_CONFIG are unequal, the interrupt processor 112 generates the voltage-mode select interrupt. In one embodiment, each of the interrupt enable bit and the interrupt type bit corresponding to the voltage-mode select interrupt is at the first logic state. Hence, the voltage-mode select interrupt is enabled and is a pulse signal. The first processor 102 receives the voltage-mode select interrupt.

The mode selector 120 receives the receive-configuration packet RX_CONFIG_PACKET, identifies the SOF and EOF data of the second control frame CTRL_FR2, and generates the mode signal MODE. In one embodiment, the mode signal MODE indicates the burst mode of transmission and reception and includes the SOF and EOF data of the second control frame CTRL_FR2 in third and fourth clock cycles, respectively. The configuration sampler 116 is connected to the mode selector 120, receives the mode signal MODE and updates the second frame-structure data FR_STRUCT2 with the SOF and EOF data of the second control frame CTRL_FR2. The mode selector 120 also generates the idle signal IDLE at the second logic state in the third clock cycle when the mode signal MODE includes the SOF data.

The transceiver 122 receives the idle signal IDLE at the second logic state. The first processor 102 switches on the power supply to the interface 106 and changes the mode of the interface 106 to the active mode. The mode selector 120 generates the idle signal IDLE at the first logic state in the fourth clock cycle when the mode signal MODE includes the EOF data. The transceiver 122 receives the idle signal IDLE at the first logic state. The first processor 102 switches off the power supply to the interface 106 and changes the mode of the interface 106 to the idle mode.

Thus, the processor 102 generates the first control data CTRL1 and the transceiver 122 transmits it along with the first control frame CTRL_FR1 to the interface 106. The interrupt processor 112 generates a set of interrupts INTERRUPT based on the second control frame CTRL_FR2 received from the interface 106 and the second control data CTRL2. The interface 106 is further connected to a set of peripheral circuits that use the first and second control data CTRL1 and CTRL2 for their operation. Thus, the processor 102 does not use a large number of GPIO pins to transmit and receive the first and second control data CTRL1 and CTRL2. This increases the number of GPIO pins available for connecting additional peripheral circuits. Further, when the mode selector 120 detects the mode of the transmission of the second control frame CTRL_FR2 and the second data DATA2 as the burst mode, the mode selector 120 generates the mode signal MODE and the idle signal IDLE. The transceiver 122 updates the mode of the interface 106 to an idle mode and an active mode based on the idle signal IDLE. Thus, the communication system 104 changes the mode of the interface 106 without a delay. This ensures accurate transmission and reception of the first and second data DATA1 and DATA2, respectively. Moreover, the communication system 104 changes the mode of the interface 106 without continuously polling it and thus reduces the power consumption of the RFIC 100.

The terms first and second logic states have been used herein to distinguish between high and low signals. For example, the first logic state could signify a signal that is 0v while a second logic state would then indicate a signal that has a logical '1' value, with the actual voltage value for logic 1 depending on circuit technology. The circuits described herein also can be designed using either positive or negative logic, so an active signal in one embodiment could be a logic '0' and an inactive signal would then have a logic value of '1'.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A communication system connected between a baseband processor and a Joint Electron Devices Engineering Council (JEDEC) Standards Document (JESD) 204B compliant serial interface for transmitting and receiving first and second JESD control frames corresponding to first and second data, respectively, the communication system comprising:

a set of configuration registers that receives and stores at least one of first and second control data from the baseband processor, and outputs at least one of first and second control-configuration data based on the first and second control data, respectively;

a packet processor that (i) receives at least one receive-configuration packet, (ii) receives the first control-configuration data from the set of configuration registers, and generates at least one transmit-configuration packet and at least one receive-configuration data based on the first control-configuration data and the at least one receive-configuration packet, respectively;

a configuration sampler that (i) receives at least one of first and second frame-configuration data, (ii) identifies first and second frame-structure data based on the first and second frame-configuration data, respectively, and (iii) outputs at least one of the first and second frame-structure data;

a timing monitor circuit that receives at least one of first and second frame-timing data and outputs at least one of first and second timing signals, respectively;

a control-frame processor that (i) receives the second JESD control frame, (ii) is connected to the packet processor, the configuration sampler, and the timing monitor circuit, (iii) receives the at least one transmit-configuration packet, the at least one of the first and second frame-structure data, and the at least one of the first and second timing signals, respectively, and (iv) generates the first JESD control frame and the at least one receive-configuration packet, wherein the first JESD control frame is generated based on the at least one transmit-configuration packet, the first timing signal, and the first frame-structure data, and wherein the at least one receive-configuration packet is generated based on the second JESD control frame, the second timing signal, and the second frame-structure data; and a transceiver connected to the serial interface, the baseband processor, and the control frame processor, wherein the transceiver (i) receives the first JESD control frame including first configuration data, the second JESD control frame including second configuration data, and the first data, respectively, (ii) identifies the first and second frame-configuration data based on the first and second configuration data, respectively, and the first and second frame-timing data based on the first and second configuration data, respectively, and (iii) outputs the at least one of the first and second frame-configuration data, the at least one of the first and second frame-timing data, the first JESD control frame, and the first data, wherein the first JESD control frame includes the first configuration data and the first control data, and wherein the serial interface receives the first JESD control frame and the first data, thereby transmitting and receiving the first and second JESD control frames corresponding to the first and second data, respectively.

2. The communication system of claim 1, wherein the transceiver outputs the second configuration data and the second data, and the baseband processor receives the second data and the second configuration data from the transceiver.

3. The communication system of claim 1, further comprising a mode selector that is connected to the control frame processor, wherein the mode selector (i) receives the at least one receive-configuration packet, (ii) generates a mode signal corresponding to the second data based on the at least one receive-configuration packet, (iii) generates an idle signal based on the mode signal, and (iv) outputs the mode and idle signals.

4. The communication system of claim 3, wherein the transceiver receives and outputs the idle signal, and the baseband processor receives the idle signal from the transceiver.

5. The communication system of claim 3, wherein the configuration sampler is connected to the mode selector and receives the mode signal and updates the second frame configuration data based on the mode signal.

6. The communication system of claim 5, wherein the mode signal indicates at least one of a burst mode and a continuous mode.

7. The communication system of claim 1, wherein the configuration sampler and the timing monitor circuit are connected to the transceiver and receive the at least one of the first and second frame-configuration data and the at least one of the first and second frame-timing data, respectively.

8. A radio frequency integrated circuit (RFIC) for connection between a baseband processor and a Joint Electron Devices Engineering Council (JEDEC) Standards Document (JESD) 204B compliant serial interface, wherein the baseband processor generates first configuration data and first and second control data, the RFIC comprising:

a communication system that receives the first configuration data and the first and second control data from the baseband processor, and transmits and receives first and second JESD control frames corresponding to first and second data, respectively, wherein the communication system comprises:

a set of configuration registers that receives at least one of the first and second control data, stores the at least one of the first and second control data, and outputs at least one of first and second control-configuration data based on the first and second control data, respectively;

a packet processor that receives at least one receive-configuration packet, receives the first control-configuration data from the set of configuration registers, and generates at least one transmit-configuration packet and receive-configuration data based on the first control-configuration data and the at least one receive-configuration packet, respectively;

a configuration sampler that receives at least one of first and second frame-configuration data, identifies first and second frame-structure data based on the first and second frame-configuration data, respectively, and outputs at least one of the first and second frame-structure data;

a timing monitor circuit that receives at least one of first and second frame-timing data and outputs at least one of first and second timing signals, respectively;

a control-frame processor that (i) receives the second JESD control frame, (ii) is connected to the packet processor, the configuration sampler, and the timing monitor circuit, (iii) receives the at least one transmit-configuration packet, the at least one of the first and second frame-structure data, and the at least one of the first and second timing signals, respectively, and (iv) generates the first JESD control frame and the at least one receive-configuration packet, wherein the first control frame is generated based on the at least one transmit-configuration packet, the first timing signal, and the first frame-structure data, and wherein the at least one receive-configuration packet is generated based on the second JESD control frame, the second timing signal, and the second frame-structure data; and a transceiver that (i) receives the second data and the second JESD control frame including second configuration data, (ii) receives the first data and the first configuration data from the baseband processor, and the first JESD control frame from the control frame processor, (iii) identifies the first and second frame-configuration data based on the first and second configuration data, respectively, and the first and second frame-timing data based on the first and second configuration data, respectively, and (iv) outputs the at least one of the first and second frame-configuration data, the at least one of the first and second frame-timing data, the first JESD control frame, and the first data, wherein the first JESD control frame includes the first configuration data and the first control data; and wherein the JESD interface (i) outputs the second JESD control frame and the second data, and (ii) receives the first JESD control frame and the first data from the communication system, such that the communication system transmits and receives the first and second JESD control frames corresponding to the first and second data, respectively.

9. The RFIC of claim 8, wherein the transceiver outputs the second configuration data and the second data, and the baseband processor receives the second data and the second configuration data from the transceiver.

10. The RFIC of claim 8, further comprising a mode selector connected to the control frame processor, wherein the mode selector (i) receives the at least one receive-configuration packet, (ii) generates a mode signal corresponding to the second data based on the at least one receive-configuration packet, (iii) generates an idle signal based on the mode signal, and (iv) outputs the mode and idle signals.

11. The RFIC of claim 10, wherein the transceiver further receives and outputs the idle signal, and the baseband processor receives the idle signal from the transceiver.

12. The RFIC of claim 10, wherein the configuration sampler is connected to the mode selector and receives the mode signal and updates the second frame-configuration data based on the mode signal.

13. The RFIC of claim 12, wherein the mode signal indicates at least one of a burst mode and a continuous mode.

14. The RFIC of claim 8, wherein the configuration sampler and the timing monitor circuit are connected to the transceiver and receive the at least one of the first and second frame-configuration data and the at least one of the first and second frame-timing data, respectively.

* * * * *